United States Patent [19]

Sikonia

[11] 4,167,474

[45] Sep. 11, 1979

[54] MULTIPLE-STAGE CATALYTIC REFORMING WITH GRAVITY-FLOWING DISSIMILAR CATALYST PARTICLES

[75] Inventor: John G. Sikonia, La Grange, Ill.

[73] Assignee: UOP Inc., Des Plaines, Ill.

[21] Appl. No.: 902,209

[22] Filed: May 2, 1978

Related U.S. Application Data

[63] Continuation of Ser. No. 809,969, Jun. 27, 1977, abandoned.

[51] Int. Cl.² ............................................. C10G 35/08
[52] U.S. Cl. ..................................... 208/140; 208/64; 208/65; 208/139
[58] Field of Search .................. 208/64, 65, 149, 152, 208/169, 174, 140, 139

[56] References Cited

U.S. PATENT DOCUMENTS

| 2,349,575 | 5/1944 | Voorhees | 208/149 |
| 2,377,512 | 6/1945 | Page | 208/64 |
| 2,471,078 | 5/1949 | Ogorzaly | 208/152 |
| 2,767,126 | 10/1956 | Rice | 208/149 |
| 3,692,496 | 9/1972 | Greenwood et al. | 208/169 |

Primary Examiner—C. Davis
Attorney, Agent, or Firm—James R. Hoatson, Jr.; Robert W. Erickson; William H. Page, II

[57] ABSTRACT

A multiple-stage catalytic conversion system in which a hydrocarbonaceous charge stock and hydrogen flow serially through a plurality of catalytic reaction zones in each of which the catalyst particles are movable via gravity-flow. Dissimilar catalyst particles are utilized in the reactor systems which share a common regenerating tower through which the catalyst particles are also downwardly movable via gravity-flow. Dissimilarity of the catalyst particles stems from a difference in activity and stability characteristics. In turn, this difference may be attributed either to physical, or chemical changes between the two composites, or both.

9 Claims, 1 Drawing Figure

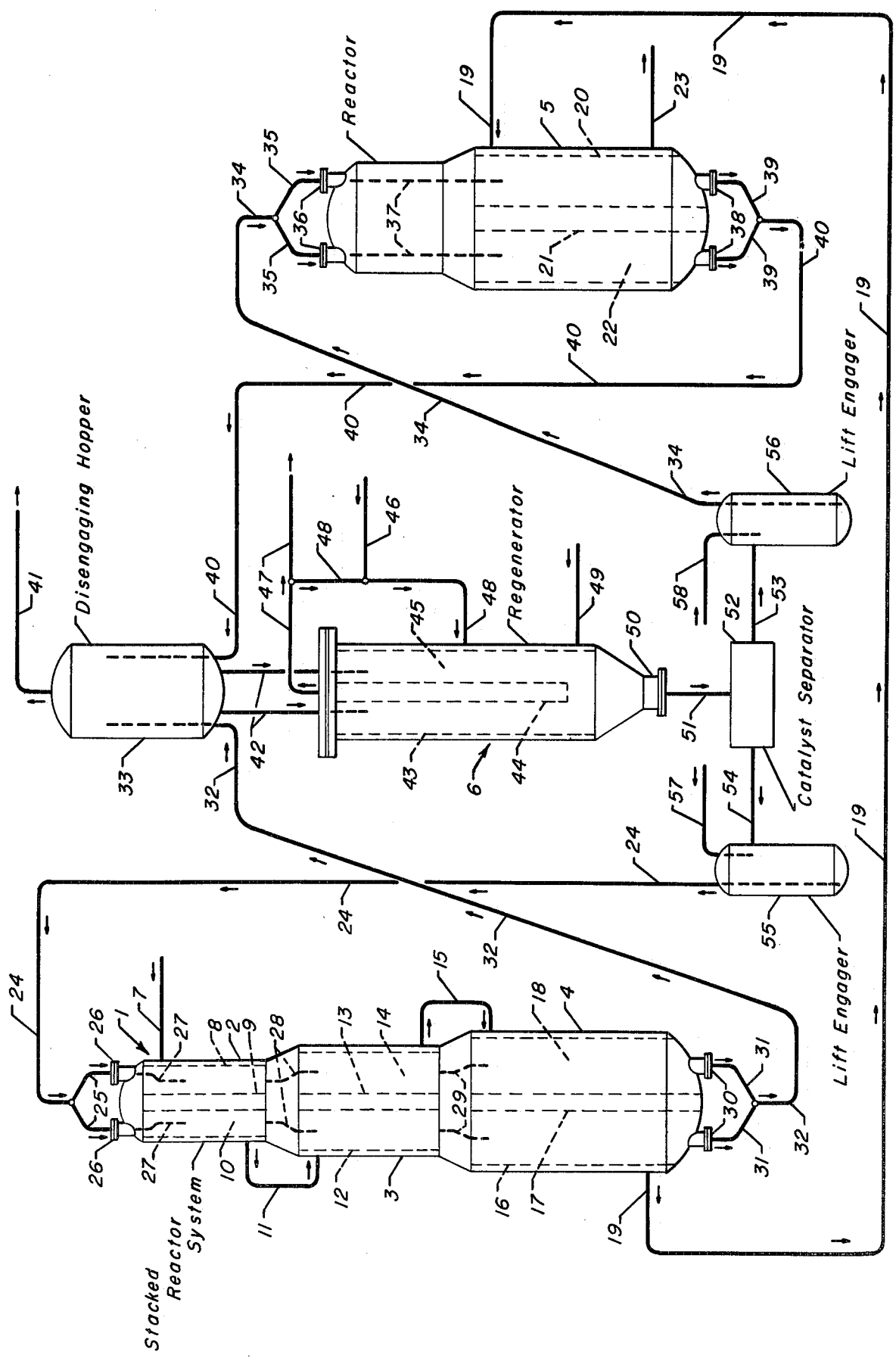

MULTIPLE-STAGE CATALYTIC REFORMING WITH GRAVITY-FLOWING DISSIMILAR CATALYST PARTICLES

This application is a continuation of Ser. No. 809,969, filed June 27, 1977 and now abandoned.

APPLICABILITY OF INVENTION

The present invention is directed toward an improved technique for effecting the catalytic conversion of a hydrocarbonaceous reactant stream in a multiple-stage reaction system wherein (i) the reactant stream flows serially through the plurality of reaction zones and, (ii) the catalyst particles are movable through each reaction zone via gravity-flow. More particularly, the described technique is adaptable for utilization in vapor-phase systems wherein the conversion reactions are principally endothermic, and where the flow of the hydrocarbonaceous reactant stream, with respect to the downward direction of catalyst particle movement, is cocurrent and essentially radial.

Various types of multiple-stage reaction systems have found widespread utilization throughout the petroleum and petrochemical industries for effecting multitudinous reactions, especially hydrocarbon conversion reactions. Such reactions are either exothermic, or endothermic, and encompass both hydrogen-producing and hydrogen-consuming processes. Multiple-stage reaction systems generally take one of two forms: (1) side-by-side configuration with intermediate heating between the reaction zones, and wherein the reactant stream or mixture flows serially from one zone to another zone; and, (2) a stacked design wherein a single reaction chamber, or more, contains the multiple catalytic contact stages. Such reactor systems, as applied to petroleum refining, have been employed to effect numerous hydrocarbon conversion reactions including those which are prevalent in catalytic reforming, alkylation, ethylbenzene dehydrogenation to produce styrene, other dehydrogenation processes, etc. My invention is specifically intended for utilization in those processes where the conversion reactions are effected in vapor-phase and catalyst particles are movable via gravity-flow, and where the reaction system exists in side-by-side relation, where two or more catalytic contact zones are "stacked", or where one or more additional reaction zones are disposed in a side-by-side relationship with the stack.

Since catalyst particles which are movable through a reaction system by way of gravity-flow are necessarily moving in a downwardly direction, the present technique contemplates the withdrawal of catalyst particles from a bottom portion of one reaction zone and the introduction of fresh, or regenerated catalyst particles into the top portion of a second reaction zone. The present technique is also intended to be applied to those reaction systems wherein the catalyst is disposed as an annular bed and the flow of the reactant stream, serially from one zone to another reaction zone, is perpendicular, or radial to the movement of catalyst particles.

A radial-flow reaction system generally consists of tubular-form sections, having varying nominal cross-sectional areas, vertically and coaxially disposed to form the reaction vessel. Briefly, the system comprises a reaction chamber containing a coaxially disposed catalyst-retaining screen, having a nominal, internal cross-sectional area less than said chamber, and a perforated centerpipe having a nominal, internal cross-sectional area which is less than the catalyst-retaining screen. The reactant stream is introduced, in vapor-phase, into the annular-form space created between the inside wall of the chamber and the outside surface of catalyst-retaining screen. The latter forms an annular-form, catalyst-holding zone with the outside surface of the perforated centerpipe; vaporous reactant flows laterally and radially through the screen and catalyst zone into the centerpipe and out of the reaction chamber. Although the tubular-form configuration of the various reactor components may take any suitable shape—e.g. triangular, square, oblong, diamond, etc.—many design, fabrication and technical considerations dictate the advantages of using components which are substantially circular in cross-section.

Illustrative of a multiple-stage stacked reactor system, having gravity-flowing catalyst particles, and to which the present invention is particularly adaptable, is that shown in U.S. Pat. No. 3,706,536 (Cl. 23-288G), issued Dec. 19, 1972. Transfer of the gravity-flowing catalyst particles, from one reaction zone to another, as well as introduction of fresh catalyst particles and withdrawal of "spent" catalyst particles, is effected through the utilization of a plurality of catalyst-transfer conduits. Deactivated catalyst particles are withdrawn from the last reaction zone and transferred to a regenerating tower through which they are also downwardly movable via gravity-flow.

It is to such systems, as well as those hereafter discussed as being illustrative of the current known state of the art, that the present invention is intended to be most appropriately applicable. Briefly, my invention concept encompasses a process wherein two separate reactor systems, each of which contains from one to three individual reaction zones, share a common catalyst regenerating tower. Each system contains a catalytic composite having different activity and stability characteristics than the composite in the other system. More specifically, the process herein described is intended to be utilized in the catalytic reforming of a hydrocarbonaceous charge stock for the production of high yields of a high octane-blending value normally liquid product.

OBJECTS AND EMBODIMENTS

A principal object of my invention is to afford an improved technique for the catalytic reforming process. A corollary objective is to increase the operating efficiency thereof while simultaneously increasing the effective utilization of the catalytic composite employed therein.

Other objects involve increased yields of normally liquid product—i.e. pentanes and heavier hydrocarbons—and hydrogen, the latter having increased purity which enhances its use for recycle purposes.

Therefore, one embodiment of the present invention is directed toward a process for catalytically reforming a hydrocarbonaceous charge stock which comprises the sequential steps of: (a) reacting said charge stock and hydrogen in contact with a first catalytic composite disposed in a first reactor system through which catalyst particles are downwardly movable via gravity-flow; (b) further reacting the resulting first reactor system effluent in contact with a second catalytic composite disposed in a second reactor system through which catalyst particles are downwardly movable via gravity-flow, said second catalytic composite having different activity and stability characteristics than said first catalytic composite; (c) at least periodically withdrawing deactivated catalyst particles from said first and second reactor systems and introducing said withdrawn catalyst particles into a common regenerating tower through which catalyst particles are downwardly movable; (d) regenerating said catalyst particles in said tower in contact therein with air, halogen and steam, and drying the resulting regenerated catalyst particles; (e) withdrawing dried, regenerated catalyst particles from said regenerating tower and separating said particles to concentrate said first catalytic composite and said second catalytic composite; and, (f) at least periodically introducing said regenerated first and second catalytic composites into said first and second reactor systems, respectively.

In a more specific embodiment, the first and second catalytic composites each contain at least one Group VIII noble metal component and a halogen component, composited with a refractory inorganic oxide, and the difference in activity and stability characteristics is effected via differing noble metal concentrations.

These, as well as other objects and embodiments will become evident from the following, more detailed description of the present hydrocarbon conversion process. In one such other embodiment, the first and second catalytic composites each contain a Group VIII noble metal component and at least one catalytic metallic modifier, and the difference in activity and stability characteristics is effected via different catalytic modifiers.

PRIOR ART

Candor compels recognition of the fact that various types of hydrocarbon conversion processes utilize multiple-stage reactor systems, either in a side-by-side configuration, as a vertically-disposed stack, or a combination of a stacked system in side-by-side relation with one or more separate reaction zones. As applied to petroleum refining, such systems may be employed in a wide variety of hydrocarbon conversion reactions. While my inventive concept is adaptable to many conversion reactions and processes, through the reactor system of which the catalyst particles are movable via gravity-flow, the same will be further described in conjunction with the well known endothermic catalytic reforming process.

Historically, catalytic reforming was effected in a non-regenerative, fixed-bed system comprising a plurality of reaction zones disposed in side-by-side relation. When the catalytic composite had become deactivated to the extent that continuous operation was no longer economically feasible, the entire unit was shut-down and the catalyst regenerated in situ. Of a more recent vintage was the so-called "swing-bed" system in which an extra reactor was substituted for one which was due to be placed off-stream for regeneration purposes. Still more recently, multiple-stage reactor systems have been provided in which the catalyst particles flow, via gravity, through each reaction zone. In a "stacked" system, the catalyst particles also flow downwardly from one catalyst-containing zone to another, and ultimately transfer to a suitable regeneration system also preferably functioning with a downwardly-moving bed of catalyst particles. In effect, the catalyst particles are maintained from one section to another in a manner such that the flow of catalyst particles is continuous, at frequent intervals, or at extended intervals, with the movement being controlled by the quantity of catalyst withdrawn from the last of the series of individual reaction zones.

U.S. Pat. No. 3,470,090 (Cl. 208-138), issued Sept. 30, 1969 illustrates a multiple-stage, side-by-side reaction system with intermediate heating of the reactant stream which flows serially through the individual reaction zones. Catalyst particles withdrawn from any one of the reaction zones are transported to suitable regeneration facilities. This type of system can be modified to the extent that the catalyst particles withdrawn from a given reaction zone are transported to the next succeeding reaction zone, while the catalyst withdrawn from the last reaction zone may be transported to a suitable regeneration facility. The necessary modifications can be made in the manner disclosed in U.S. Pat. No. 3,839,197 (Cl. 208-174), issued Oct. 1, 1974, involving an inter-reactor catalyst transport method. Catalyst transfer from the last reaction zone in the plurality to the top of the catalyst regeneration zone is made possible through the use of the technique illustrated in U.S. Pat. No. 3,839,196 (Cl. 208-174), issued Oct. 1, 1974.

A stacked reaction zone configuration is shown in U.S. Pat. No. 3,647,680 (Cl. 208-65), issued Mar. 7, 1972, as a two-stage system having an integrated regeneration facility which receives that catalyst withdrawn from the bottom reaction zone. Similar stacked configurations are illustrated in U.S. Pat. No. 3,692,496 (Cl. 23-288G), issued Sept. 19, 1972, and U.S. Pat. No. 3,725,249 (Cl. 208-139) issued Apr. 3, 1973.

U.S. Pat. No. 3,725,248 (Cl. 208-138), issued Apr. 3, 1973 illustrates a multiple-stage system in side-by-side configuration with gravity-flowing catalyst particles being transported from the bottom of one reaction zone to the top of the next succeeding reaction zone, those catalyst particles being removed from the last reaction zone being transferred to suitable regeneration facilities.

As hereinbefore stated, general details of a three-reaction zone, stacked system are presented in U.S. Pat. No. 3,706,536 (Cl. 23-288G), issued Dec. 19, 1972, and illustrates one type of multiple-stage system to which the present inventive concept is applicable. As generally practiced in a catalyst reforming unit, each succeeding reaction zone contains a greater volume of catalyst in that the annular-form catalyst-holding zone is greater in cross-sectional area.

These illustrations are believed to be fairly representative of the art which has been developed in multiple-stage conversion systems wherein catalyst particles are movable through each reaction zone via gravity-flow.

Relatively recent U.S. Pat. No. 3,981,824 (Cl. 252-415), issued Sept. 21, 1976, is directed specifically toward a regeneration method for gravity-flowing catalyst particles which comprise a Group VIII noble metal component and a halogen component composited with a suitable refractory inorganic oxide—e.g. gamma alumina. This particular method, as well as others, is suitable for use in the present processing technique.

U.S. Pat. No. 3,864,240 (Cl. 208-64), issued Feb. 4, 1975, is illustrative of the integration of a reaction system having gravity-flowing catalyst particles with a fixed-bed system. As stated in this reference, one of the advantages resides in revamping an existing three-reaction zone, fixed-bed system to conform to the integrated system. Indicated is the advantage of enabling a refiner to adjust his ultimate product slate by having a mordenite-containing composite in the gravity-flowing zone as contrasted to a principally alumina catalyst in the plurality of fixed-bed reaction zones. However, there is no indication of utilizing composites having different activity and stability characteristics in a process having all gravity-flowing catalyst systems. Furthermore, there is no awareness of effecting the difference through changes in active metal component concentration and/or kind, or in changes with respect to halogen content.

In brief summation, the prior art directed toward catalytic conversion systems in which all the catalyst particles are movable via gravity-flow, is no cognizant of the technique herein described wherein two separate systems utilize composites having different degrees of activity and stability, and share a common regenerating tower.

SUMMARY OF INVENTION

To reiterate briefly, the process encompassed by my inventive concept is suitable for use in hydrocarbon conversion systems which are characterized as multiple-stage and in which catalyst particles are movable via gravity-flow through each reaction zone. Furthermore, the present invention is principally intended for utilization in reactor systems where the principal reactions are endothermic and are effected in vapor-phase. Although the following discussion is specifically directed toward catalytic reforming of naphtha boiling range fractions, there is no intent to so limit the present invention. Catalytic reforming, as well as many other processes, has experienced several phases of development currently terminating in the system in which the catalyst beds assume the form of a descending column in one or more reaction vessels. Typically, the catalysts are utilized in spherical form having a nominal diameter ranging from about 1/32-inch to about 5/32-inch in order to offer free-flow characteristics which will neither bridge, nor block the descending column, or columns of catalyst within the overall reactor system.

In one such multiple-stage system, the reaction chambers are vertically stacked, and a plurality (generally from about 6 to about 16) of relatively small diameter conduits are employed to transfer catalyst particles from one reaction zone to the next lower reaction zone (via gravity-flow) and ultimately to withdraw catalyst particles from the last reaction zone. The latter are usually transported to the top of a catalyst regeneration facility, also functioning with a descending column of catalyst particles; regenerated catalyst particles are then transported to the top of the upper reaction zone of the stack. In order to facilitate and enhance gravity-flow within each reaction vessel, as well as from one zone to another, it is particularly important that the catalyst particles have a relatively small nominal diameter, and one which is preferably less than about 5/32-inch. In a conversion system having the individual reaction zones in side-by-side relationship, catalyst transport vessels (of the type shown in U.S. Pat. No. 3,839,197) are employed in transferring the catalyst particles from the bottom of one zone to the top of the succeeding zone, and from the last reaction zone to the top of the regeneration facility.

Catalytic reforming of naphtha boiling range hydrocarbons, a vapor-phase operation, is effected at conversion conditions which include catalyst bed temperatures in the range of about 700° F. to about 1020° F.; judicious and cautious techniques generally dictate that catalyst temperatures not substantially exceed a level of about 1020° F. Other conditions generally include a pressure from about 50 psig. to about 1000 psig., a liquid hourly space velocity (defined as volumes of fresh charge stock per hour, per volume of total catalyst particles) of from 0.2 to about 10.0 and a hydrogen to hydrocarbon mole ratio generally in the range of about 0.5:1.0 to about 10.0:1.0. As those possessing the requisite skill in the petroleum refining art are aware, the described continuous regenerative reforming system offers numerous advantages when compared to the prior art fixed-bed system. Among these is the capability of efficient operation at comparatively lower pressures—e.g. 50 psig. to about 200 psig. —and higher liquid hourly space velocities—e.g. about 3.0:1.0 to about 8.0:1.0. As a result of continuous catalyst regeneration, higher consistent inlet catalyst bed temperatures can be maintained—e.g. 950° F. to about 1010° F. Furthermore, there is afforded a corresponding increase in both hydrogen production and hydrogen purity in the recycled vaporous phase from the product separation facility.

Catalytic reforming reactions are multifarious, and include dehydrogenation of naphthenes to aromatics, the dehydrocyclization of paraffins to aromatics, the hydrocracking of long-chain paraffins into lower-boiling normally-liquid material and, to a certain extent, the isomerization of paraffins. These reactions, the net result of which is endothermicity, are effected through the utilization of one or more Group VIII noble metals (e.g. platinum, osmium, iridium, rhodium, ruthenium, palladium) combined with a halogen (e.g. chlorine and/or fluorine) and a porous carrier material such as alumina. Recent investigations have indicated that additional advantageous results are attainable and enjoyed through the cojoint use of a catalytic modifier; these are generally selected from the group of iron, cobalt, copper, nickel, gallium, zinc, germanium, tin, cadmium, rhenium, bismuth, vanadium, alkali and alkaline-earth metals, and mixtures thereof. Regardless of the selected catalytic composite, the ability to attain the advantage over the common fixed-bed systems is greatly dependent upon achieving acceptable catalyst flow downwardly through the reactor system and through the regenerating tower.

Catalytic reforming is a well known process which has been thoroughly described in the literature, having been a commercially important tool of the petroleum refining industry for about three decades. One of the many things gleaned from the vast amount of catalytic reforming experience, and resulting knowledge, is the soundness of utilizing multiple-stages, each of which contains a different quantity of catalyst, generally expressed as volume percent. The reactant stream, hydrogen and the hydrocarbon feed, flow serially through the reaction zones in order of increasing catalyst volume with, of course, interstage heating. In a three-reaction zone system, typical catalyst loadings are: first, 10.0% to about 30.0%; second, from about 20.0% to about 40.0%; and, third, from about 40.0% to about 60.0%. With respect to a four-reaction zone system, suitable catalyst loading would be: first, 5.0% to about 15.0%; second, 15.0% to about 25.0%; third, 25.0% to about 35.0%; and, fourth, 35.0% to about 50.0%. Unequal catalyst distribution, increasing in the serial direction of reactant stream flow, facilitates and enhances the distribution of the reactions as well as the overall heat of reaction.

Reforming catalytic composites known and described in the applicable prior art are intended for use in the process encompassed by the present invention. Essential, however, to my invention is the utilization of dissimilar reforming catalysts which may be characterized as possessing different combined activity and stability (A/S) characteristics. For the purposes of further explanation, it is believed that several definitions are warranted. As employed herein, "activity" is defined as the level of operating severity required to attain a given, desired octane rating with respect to the normally liquid reformed product effluent—i.e. pentanes and heavier hydrocarbons. As an example, considering a final product having a clear research octane rating of 100.0, with all variables excepting catalyst bed temperature being constant, a catalyst producing the indicated product at 945° F. (507° C.) is more active than one which requires a temperature of 965° F. (518° C.). Likewise, where catalyst bed temperature is maintained constant and liquid hourly space velocity (LHSV) is adjusted to attain the target octane rating, a catalyst which produces the desired result at 2.0 LHSV is more active than one requiring 1.75 LHSV.

Catalyst "stability" is herein defined as the rate of change in activity relative to catalyst life measured as barrels of charge stock per pound (BPP) of catalyst disposed within the reaction chamber. Among those versed in catalytic reforming catalysts, stability is most often expressed in units of temperature increase per unit of catalyst life to maintain a constant target octane rating with respect ot the normally liquid product effluent—this is commonly stated as °F./BPP. Thus, a catalytic composite indicating a deactivation rate of 2.5 °F./BPP is significantly more stable than one which deactivates at a rate of 8.0° F./BPP. Also utilized in selecting the catalytic composites for use in reforming systems are (1) the yield of pentanes and heavier product and, (2) the purity of hydrogen in the gaseous products. With respect to the latter, calculations are generally based upon the total quantity of butanes and lighter vaporous material.

Reforming catalytic composites are unique in that they possess dual functionality; although this may be defined in a number of ways, the most common is that such catalysts simultaneously exhibit acidic properties as well as metallic hydrogenation/dehydrogenation functionality. Dissimilarity of the catalysts employed in the present processing technique is primarily achieved by varying the dual-function character of the composites. As above set forth, the catalytic composites exhibit different combined activity and stability characteristics. In explanation, it will be presumed that a wide spectrum of reforming composites are subjected to activity and stability performance tests, and are rated, in comparison to a standard catalyst, and to each other on a basis of one through ten, the latter representing highest activity and greatest activity. In accordance with this arbitrarily selected scale, where catalyst "A" has an activity of 5 and a stability rating of 10, while catalyst "B" has an activity of 10 and exhibits a stability rating of 5, the catalysts have different combined activity and stability characteristics. Likewise, where both composites have an activity rating of 8, and one a stability rating of 8, while the second has a stability rating of 3, they have different combined activity and stability characteristics for the purposes of the present invention.

Reforming catalysts, as hereinbefore stated, comprise at least one Group VIII noble metal component, platinum, palladium, rhodium, ruthenium, osmium and/or iridium, and an acid-acting halogen component, generally chlorine, fluorine, or both. These are composited, during the manufacturing technique, with a refractory inorganic oxide from the group of alumina, silica, zirconia, strontia, mangesia, hafnia and mixtures thereof, etc. Catalytic modifiers, of the type previously described, are often combined therewith for the purpose of adjusting the activity/stability relationship. Catalytic attenuators, selected from alkali and alkaline-earth metals are employed at times where charge stock characteristics so dictate. The Group VIII noble metal component, or components, will be present in an amount of about 0.1% to about 2.0% by weight, calculated on an elemental basis. Excellent results are achievable when the catalyst contains about 0.3% to about 0.9% by weight of the group VIII noble metal component, or components. Halogen may be composited with the carrier material during impregnation of the latter with the active metallic components. The quantity of halogen, whether chlorine, fluorine, or both, is such that the final catalytic composite contains about 0.1% to about 1.5% by weight, and most generally from about 0.3% to about 1.2%, calculated on an elemental basis. With respect to the metallic catalytic modifiers, they are preferably present in an amount in the range of about 0.1% to about 5.0% by weight, again on an elemental basis. Regardless of the absolute quantities or character of these catalytic modifiers, the atomic ratio of the Group VIII noble metal to the catalytic modifier in the catalyst is preferably selected from the range of 0.1:1.0 to about 3.0:1.0, with excellent results being attainable at an atomic ratio of about 0.5:1.0 to about 1.5:1.0.

In particular situations, with certain naptha boiling range feedstocks, it may be desirable to attenuate the acid function of the selected catalytic composite. This is accomplished through the addition of an alkalinous metal component in the amount of from about 0.01% to about 1.5% by weight. This component is selected from the group of lithium, sodium, potassium, rubidium, cesium, barium, strontium, calcium, magnesium, beryllium, mixtures of two or more, etc. Reforming catalytic composites, following preparation and calcination thereof, are subjected to a substantially water-free reduction in hydrogen. Reduction may be conveniently performed in situ as an integral step of a start-up sequence provided precautions are observed to pre-dry the system to a substantially water-free state. Catalytic reforming processes may be improved when the reduced composite is subjected to a presulfiding operation to incorporate from about 0.05% to about 0.5% by weight of sulfur, on an elemental basis.

The difference in activity and stability characteristics can be achieved through changes in physical properties, chemical properties, or both. The former would include apparent bulk density, pore diameter (nominal) and surface area as generally measured in square meters per gram of catalyst. Changes in chemical composition offer a wider variety of activity and/or stability characteristics and are, therefore, to be preferred. Considering first the refractory inorganic oxide carrier, alumina in and of itself, compared to a carrier containing about 20.0% by weight of silica, will exhibit different activity and stability, notwithstanding the same Group VIII noble metal and halogen concentration. In the interest of both brevity and clarity, the following discussion will be limited to reforming catalysts utilizing an all-alumina carrier are chlorine as the halogen component. It is understood that there is no intent to so limit the present invention.

Where the catalytic composites both contain platinum as the Group VIII metallic component, the difference in combined activity and stability characteristics (A/S) characteristics) can be achieved simply by varying the concentration of the platinum. Thus, a composite of alumina, 0.9% chlorine and 0.75% by weight of platinum, will have different combined A/S characteristics than one of alumina, 0.9% chlorine and 0.375% platinum. Similarly, a platinum/alumina catalyst containing 1.0% by weight of chlorine will have a different A/S characteristic than one which is substantially free from chlorine. On the other hand, the chlorine concentrations may be varied to effect the change in A/S characteristics. Additionally, one catalyst may contain platinum as the sole Group VIII metallic component, while the second may contain both platinum and iridium. Bi-metallic composites will differ from mono-metallic composites, as will tri-metallic and tetra-metallic composites.

Likewise, a catalyst containing platinum, vanadium and chlorine composited with alumina, will be different in A/S characteristics than the same catalyst without vanadium. A platinum/alumina/chlorine catalyst will exhibit different characteristics than a palladium-/alumina/chlorine catalyst. Where the catalytic composite contains the same Group VIII component, and the same concentration of chlorine, the difference can be attained through the use of the same catalytic modifier in different concentrations. Whether a calcined and reduced catalyst is subjected to a sulfiding technique prior to use will also affect its A/S characteristics, as will a different concentration of sulfur where the other components and concentrations are identical.

Other changes in the chemical make-up of the dissimilar catalytic composites for use herein, to achieve different A/S characteristics, will become evident to those possessing the requisite skill in the catalytic reforming art. It is understood that no particular technique is essential to the method of the present invention, only that the activity and stability characteristics, however analytically determined, be different.

Briefly, the present invention utilizes two separate reactor systems, through each of which the catalyst particles are movable downwardly via gravity-flow, and a common regenerating tower, through which the catalyst particles are also downwardly movable via gravity-flow. Each reactor system contains a catalyst which exhibit different activity and stability characteristics than that catalyst disposed in the other reactor system. Catalyst particles are at least periodically withdrawn from each of the reactor systems and introduced into a common regenerating tower. Regeneration is effected by contacting the deactivated particles with air, halogen and steam, followed by a drying operation in substantially moisture-free air. The catalyst particles may be subjected to a reduction technique either in a separate vessel, or in individual vessels integral with the individual reactor systems. Regardless, the regenerated and dried particles are separated to concentrate one catalyst from the other, and at least periodically introduced into the individual reactor systems. The precise technique employed for catalyst regeneration and reconditioning (halogen readjustment) is not an essential feature of my invention—any of the prior art methods which employ combinations of air, recycled combustion flue gas, steam and halogen will suffice. Similarly, the separation of the dried, regenerated catalyst particles may be effected via any suitable technique which maintains the integrity of the two dissimilar catalytic particles. For example, the separation may be effected by virtue of a difference in densities. Where one composite has a nominal diameter of 1/16-inch and the other 1/32-inch, the particles are readily segregated by means of a particle-size separator. One of the composites may contain a metal which is subject to magnetic attraction, in which case separation is effected in a magnetic separator.

With respect to the two reactor systems, each will comprise at least one reaction zone. Many varied configurations are made possible by virtue of the present invention. For instance, one system may contain two or three individual reaction zones while the second system consists of one or two individual zones. As previously set forth, the reaction zones contain varying quantities of catalyst, generally increasing in the direction of reactant stream flow. Catalytic reforming, being overall an endothermic process, requires interstage heating; therefore, the precise number of individual reaction zones, as well as catalyst distribution, will depend primarily upon the physical and chemical characteristics of the fresh feed charge stock and the final estimates relative to distribution of the reactions and overall heat of reaction. As hereinbefore stated, catalytic reforming involves four principal reactions, the overall result of which is temperature decrease, or endothermicity. Considering, for the sake of illustration, a four-reaction zone system having a catalyst distribution of 10.3%, 15.0%, 25.0% and 50.0%, the initial reaction zone serves to dehydrogenate substantially all the napthenic hydrocarbons to form aromatics, a highly endothermic reaction. In the second reaction zone, following inter-heating to raise the temperature of the first zone effluent, the remaining naphthenes are dehydrogenated and dehydrocyclization of paraffins to produce aromatics is effected, also endothermic; the latter also takes place in the third reaction zone in addition to isomerization of normal paraffins to the isomeric counterparts. Some isomerization takes place in the fourth reaction zone along with the hydrocracking of long-chain paraffins into lower molecular weight, normally liquid paraffins. The present inventive concept, using two dissimilar catalytic composites, when utilized in conjunction with continuous catalyst regeneration, catalytic reforming, in which catalyst particles are movable way of gravity-flow, further enhances the many advantages of the latter and affords a process tailor-made to the charge stock characteristics and desired results.

BRIEF DESCRIPTION OF DRAWING

In further describing the present inventive concept and the catalytic reforming process encompassed thereby, reference will be made to the accompanying drawing which serves to illustrate one or more embodiments thereof. Presentation is made via a simplified schematic flow diagram in which only the principal pieces of equipment are shown. These are: a three reaction zone, stacked reactor system 1; regenerating tower 6, complete with a catalyst-fine disengaging hopper 33; a particle separator 52, coupled with two lift engagers 55 and 56; and, a fourth reaction zone 5. Details such as pumps and compressors, heaters and coolers, condensers, heat-exchangers and heat-recovery circuits, start-up lines, valving and similar hardware have been omitted as being non-essential to a clear understanding of the techniques involved. The utilization of these miscellaneous appurtenances, to modify the illustrated process, is well within the purview of one skilled in the art, and will not remove the resulting process beyond the scope and spirit of the appended claims.

DETAILED DESCRIPTION OF DRAWING

Specifically referring now to the drawing, stacked reactor system 1 is shown as having three individual reaction zones 2, 3 and 4 having disposed therein a catalytic composite of gamma alumina, 0.95% by weight of combined chlorine and about 0.75% by weight of platinum, and having a nominal diameter of 1/32-inch. On the arbitrarily selected basis of one through ten, this catalyst has an activity rating of about 8 and a stability of about 6. A dissimilar catalyst of gamma alumina, 0.95% by weight of combined chlorine and 0.375% by weight of platinum, having a nominal diameter of 1/16-inch and presulfided to a sulfur level of 0.25% by weight, is disposed in reaction zone 5; this catalyst exhibits an activity level of 4 and a stability level of about 9. Thus, in this illustration, the fresh feed charge stock first "sees" the composite of comparatively high activity/low stability and subsequently the composite having comparatively low activity/high stability. In some situations, principally involving considerations of charge stock characteristics and overall heats of reaction, the composites may be reversed—i.e. low activity/high stability catalyst followed by high activity/low stability catalyst.

The naphtha boiling range feedstock, in admixture with a recycled hydrogen-rich vaporous phase, is introduced via line 7 into reaction zone 2. The hydrogen to hydrocarbon mole ratio is about 6.0:1.0, the pressure approximately 100 psig. and the liquid hourly space velocity is about 1.5, based upon the total quantity of catalyst in the entire system. Prior to entering reaction zone 2, the combined feed is increased to a temperature such that the catalyst bed inlet temperature is about 950° F. (510° C.). The charge stock flows laterally, from the space between the inside wall of reaction zone 2 and catalyst retaining screen 8, into and through annular-form catalyst bed 10 and into centerpipe 9 from which the first zone effluent is withdrawn by way of conduit 11.

After passing through a reaction zone interheater (not illustrated), the product effluent continues through conduit 11 and is introduced thereby into reaction zone 3. The feed stream flows laterally and radially through annular-form catalyst bed 14 which is defined by catalyst retaining screen 12 and perforated centerpipe 13. Reaction product effluent passes through line 15, is increased in temperature and introduced into lowermost reaction zone 4. Reaction zone 4 also contains an annular-form catalyst bed 18 which is formed by perforated center-pipe 17 and catalyst retaining screen 16. Conduit 19 carries the product effluent from reaction zone 4 into the single reaction zone system 5, following inter-heating to once again increase the temperature to a level which provides a catalyst bed inlet temperature of about 950° F. (510° C.).

With respect to effluent conduits 11, 15 and 19, these will originate, in a commercially-designed system, from the lowermost terminus of centerpipes 9, 13 and 17, respectively. They have been shown as emanating from the side of reaction zones 2, 3 and 4 only for convenience and simplification of the drawing. This has also been done in regard to reaction zone 5, its centerpipe 21 and outlet conduit 23.

After being increased in temperature to about 950° F. (510° C.), the third reaction zone effluent in line 19 is introduced into reaction zone 5, in which it traverses annular-form catalyst bed 22 which is defined by catalyst retaining screen 20 and perforated centerpipe 21. the final product effluent is withdrawn via conduit 23 and transported thereby into cooler/condenser and separation facilities (not illustrated) to provide the normally liquid product and a hydrogen-rich vaporous phase. A portion of the latter is vented from the system on pressure control, the remainder being recycled to combine with the fresh feed charge stock to reaction zone 2 via line 7.

Periodically, regenerated catalyst particles from conduits 25 are introduced, through catalyst inlet ports 26 and a plurality of transfer conduits 27, generally numbering from six to sixteen, into annular-form catalyst bed 10. Catalyst particles flow via gravity therefrom, by way of a plurality of transfer conduit 28 into annular-form catalyst bed 14 which is maintained within reaction zone 3. Similarly, the catalyst particles traverse reaction zone 3 via gravity-flow and are transferred via a plurality of conduits 29 into annular-form catalyst bed 18 within reaction zone 4. Deactivated catalyst particles are removed from lowermost reaction zone 4 through a plurality of outlet ports 30 and conduits 31. These particles are introduced into a solids-withdrawal and transport vessel of the type shown in U.S. Pat. No. 3,856,662 (Cl. 208—171), issued Dec. 24, 1974, but not illustrated in the present drawing. The withdrawn catalyst particles are transported via lift line 32 into disengaging hopper 33.

Similarly, regenerated catalyst particles are introduced through a plurality of conduits 35, catalyst inlet ports 36 and a plurality of transfer conduits 37, into annular-form catalyst bed 22 disposed within reaction zone 5. Deactivated particles are withdrawn through outlet ports 38 and conduits 39, introduced into a transport vessel (not illustrated), and transported via lift line 40 into disengaging hopper 33.

Disengaging hopper 33 serves to separate catalyst fines and dust-like particles which are removed through conduit 41 to a suitable metals recovery facility. The mixture of catalyst particles—i.e. those having a nominal diameter of 1/32-inch from reaction zone 4, and those with a 1/16-inch nominal diameter from reaction zone 5—flows through a plurality of transfer conduits 42 into regenerating tower 6. These deactivated catalyst particles are disposed therein as an annular-form bed 45 which is defined by a catalyst retaining screen 43 and the combustion products flue gas centerpipe 44. A mixture of air, steam and a chlorine-containing compound are introduced by way of line 46, admixed with recycled flue gas from line 48 and introduced thereby into the upper carbon-burning/halogenation section of regenerating tower 6. In this section, coke and other carbonaceous materials are removed and the chloride content of the catalysts adjusted to the original level. Substantially dry air is introduced into the lower section of regenerating tower 6, the drying section, to remove substantially all the residual moisture from the catalyst particles. Flue gas combustion products are withdrawn through centerpipe 44 and conduit 47. A portion thereof is diverted through line 48 to combine with the steam, chlorine-containing compound and air being introduced through line 46; dilution with flue gas in this manner is advisable in order to maintain the oxygen level in the carbon-burning section at about a maximum of 2.0%.

Dried, regenerated catalyst particles are removed via outlet port 50 and introduced into catalyst separator 52 by way of conduit 51. Catalyst particles having a nominal diameter of 1/32-inch are separated and introduced through conduit 54 into lift engager 55; the catalyst particles having a nominal diameter of 1/16-inch are introduced into lift engager 56 via line 53. The life engagers 55 and 56 are of the type found in the prior art hereinbefore described. A lift gas is introduced into lift engager 55 through line 57 and carrier the catalyst particles through lift line 24 to the top of stacked reactor system 1. Likewise, the lift gas introduced via line 58 into lift engager 56 transports the 1/16-inch diameter catalyst particles through lift line 34 to the top of reaction zone 5.

The foregoing clearly illustrates the method of effecting the process encompassed by the present invention, and indicates the many advantages and benefits afforded through the utilization thereof. Others will become evident to those possessing the requisite skill in the catalytic reforming art.

I claim as my invention:

1. A process for catalytically reforming a hydrocarbonaceous charge stock which comprises contact of the said charge stock with two discrete catalytic composite entities in the sequential steps of:
   (a) reacting said charge stock and hydrogen in contact with a first of said two discrete catalytic composite entities comprising a Group VIII metal, at least one metallic catalytic modifier, and a halogen component disposed in a first reactor system on a porous carrier material through which said first catalytic composite entity is downwardly movable via gravity-flow to form a first reactor system effluent stream;
   (b) reacting said first reactor system effluent stream in contact with a second of said two discrete catalytic composite entities comprising a Group VIII metal, at least one metallic catalytic modifier, and a halogen component disposed in a second reactor system on a porous carrier material through which said second catalytic composite entity is downwardly movable via gravity-flow, said second catalytic composite entity having different activity and stability characteristics as a result of a variance in the concentration of said Group VIII metal, modifying metal, or halogen than said first catalytic composite entity;
   (c) at least periodically withdrawing deactivated first and second discrete catalyst composites respectively from both said first and second reactor systems and commingling both said withdrawn first and second discrete catalyst entities into a common regenerating tower through which said commingled discrete catalyst entities are downwardly movable;
   (d) regenerating said commingled discrete catalyst entities in said common regeneration tower in contact with air, halogen and stream, and drying the resulting commingled regenerated catalyst entities;
   (e) withdrawing dried, commingled regenerated discrete catalyst entities of different catalytic activity and stability from said common regenerating tower and separating said discrete catalytic entities as a function of their difference in halogen, Group VIII metal, or modifying metal content to concentrate said first discrete catalytic composite entity and said second discrete catalytic composite entity; and
   (f) at least periodically introducing said first and second regenerated catalytic composite entities into said respective first and second reactor systems.

2. The process of claim 1 further characterized in that said first reactor system comprises a plurality of reaction zones and said first catalytic composite entity is movable from one zone to the next succeeding zone via gravity-flow.

3. The process of claim 1 further characterized in that said second reactor system comprises a plurality of reaction zones and said second catalytic composite entity is movable from one zone to the next succeeding zone via gravity-flow.

4. The process of claim 1 further characterized in that said first and second catalytic composite entity are separated, following regeneration, in a magnetic separation zone.

5. The process of claim 1 further characterized in that said first and second catalytic composite entity each contain at least one Group VIII noble metal component and a halogen component, composited with a refractory inorganic oxide, and the difference in activity and stability characteristics is effected via differing noble metal concentrations.

6. The process of claim 1 further characterized in that said first and second catalytic composite entity each contain a halogen component and the difference in activity and stability characteristics is effected via differing halogen concentrations.

7. The process of claim 1 further characterized in that said first and second catalytic composite entity each contain a Group VIII noble metal component and at least one catalytic metallic modifier, and the difference in activity and stability characteristics is effected via different catalyst modifiers.

8. The process of claim 1 further characterized in that said first reactor system contains at least two individual reaction zones and said second reactor system consists of a single reaction zone.

9. The process of claim 5 further characterized in that said Group VIII noble metal component is a platinum component.

* * * * *